United States Patent
Lambert et al.

(10) Patent No.: US 6,470,447 B1
(45) Date of Patent: Oct. 22, 2002

(54) ENABLING CONFORMANCE TO LEGISLATIVE REQUIREMENTS FOR MOBILE DEVICES

(75) Inventors: Howard Shelton Lambert, Hedge End (GB); James Ronald Lewis Orchard, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,826

(22) Filed: Jun. 10, 1999

(30) Foreign Application Priority Data

Mar. 31, 1999 (GB) ............................................. 9907307

(51) Int. Cl.[7] ........................... H04L 9/12; H04M 1/247
(52) U.S. Cl. ...................... 713/151; 713/152; 713/153; 380/258; 380/270; 455/550; 455/560
(58) Field of Search .................................. 713/151, 152, 713/153, 154; 380/258, 270; 455/426, 428, 429, 432, 433, 435, 436, 437, 446, 550, 560

(56) References Cited

U.S. PATENT DOCUMENTS

| | | | |
|---|---|---|---|
| 4,720,859 A | * | 1/1988 | Aaro et al. .................... 380/23 |
| 5,594,798 A | | 1/1997 | Cox et al. ..................... 380/49 |
| 5,594,947 A | | 1/1997 | Grube et al. ................ 455/54.2 |
| 5,651,068 A | * | 7/1997 | Klemba et al. ................ 380/25 |
| 5,732,349 A | | 3/1998 | Canpei et al. .............. 455/435 |
| 5,781,628 A | | 7/1998 | Alperovich et al. ........... 380/9 |
| 5,966,448 A | * | 10/1999 | Namba et al. ................ 380/33 |
| 6,094,578 A | * | 7/2000 | Purcell et al. .............. 455/426 |
| 6,208,857 B1 | * | 3/2001 | Agre et al. .................. 455/428 |

FOREIGN PATENT DOCUMENTS

| | | | | |
|---|---|---|---|---|
| CA | 2186699 | | 3/1997 | ............. H04L/9/28 |
| EP | 779760 | | 6/1997 | ............ H04Q/7/32 |

* cited by examiner

Primary Examiner—Justin T. Darrow
(74) Attorney, Agent, or Firm—Jeanine S. Ray-Yarletts

(57) ABSTRACT

Provided are a method and a mechanism for dynamically controlling the performance of communication-related operations of a mobile device in accordance with legislative requirements of the particular location of the mobile device and the location of the computing device with which it is to communicate, and also in accordance with communication requirements of application programs at either end of the communication link. A first use of the invention is for ensuring conformance of a mobile device's communications to the cryptographic requirements of different countries, even when the device crosses a country boundary during communication.

18 Claims, 2 Drawing Sheets

ENABLING CONFORMANCE TO LEGISLATIVE REQUIREMENTS FOR MOBILE DEVICES

FIELD OF INVENTION

The present invention relates to mobile computing and, in particular, to a mechanism enabling modification of the operation of a mobile device when it crosses a country boundary in order to maintain conformance with different countries' legislative requirements such as cryptographic restrictions or other area-specific communications requirements.

BACKGROUND OF THE INVENTION

There are differing laws in different countries as to the strength and/or types of cryptography which are allowed, including differences between European countries, with some authorities wanting to ensure that authorised signal interception remains technically feasible. For example, a country may permit use of the RSA cryptographic algorithm with 512 bit keys but not using a key length of 1024 bits, or a country may permit use of DES but not 3DES, or use of any cryptographic algorithms up to 128 bit key length. There are also instances where certain countries are on a prohibited list such that exchanging encrypted data with any enterprises in that country is not permitted.

Mobile devices such as cellular telephones and communications-enabled Personal Digital Assistants (PDAs) are now capable of running application programs in addition to exchanging voice data, and cellular telephones are frequently used as the mechanism for portable computers to connect to a network to exchange data with other computers. Although encryption/decryption is a good idea when carrying out any sensitive transaction, such as an on-line credit-card purchase or an exchange of confidential information, encryption of data flows is particularly important for wireless communications since wireless communications are easier to intercept than communications sent via wired connections.

Any enterprises and individuals wishing to exchange encrypted data in the mobile environment, as well as any enterprise selling mobile computing devices, will soon face the problem of how to ensure that users of mobile computing devices and the parties they exchange data with conform to the legislative cryptography requirements of the countries at each end of the communication link. This is a particular problem since the mobile devices can be moved across country boundaries, such that a static solution would be inadequate. This problem will be faced by, for example, banks with networked computers which enable application programs running on mobile devices to communicate with application programs on the bank's computer systems and will also be faced by the mobile user. The bank will require a mechanism to ensure conformance to various national laws if its international business is to be approved by regulatory authorities in the respective countries.

U.S. Pat. No. 5,781,628 discloses selectively restricting encryption of communications within a telecommunications network in accordance with prohibitions on encryption for particular countries. U.S. Pat. No. 5,781,628 only discloses disabling encryption capabilities when required and this does not take account of the more subtle cryptographic requirements which are in place in many countries. For example, as noted above, use of cryptographic algorithms may be permitted if the key bit length is no more than a defined maximum or it may be that only certain types of cryptographic algorithm are prohibited.

Furthermore, U.S. Pat. No. 5,781,628 does not disclose any mechanism which enables performance of a selection of cryptographic components with reference to the specific requirements of communicating application programs running on communications devices. Indeed, U.S. Pat. No. 5,781,628 includes no disclosure of any mechanism which takes account of whether encryption is actually required. Although this might appear inessential to the simple determination in U.S. Pat. No. 5,781,628 of whether to disable all cryptographic functions for voice calls (in accordance with the strict legislative requirements of some countries), it does not provide adequate support for communicating application programs which have a required minimum security level. U.S. Pat. No. 5,781,628 does not enable a consideration of both relevant cryptographic restrictions and application requirements and a decision to be made on whether to break a communication connection or proceed with communication using a restricted cryptography level.

Cryptographic requirements are one of many examples of differences between the laws of different countries, and as such are one example of legislative requirements which would benefit from a method and mechanism for ensuring conformance to the different laws for mobile devices. As another example, legislation may prohibit a computing device user from using certain technology within prohibited countries (for example, if that technology is relevant to defence). As a further example, legislation may dictate the language which must be used for financial institutions' electronic transactions.

DISCLOSURE OF THE INVENTION

The present invention provides a method and a mechanism for dynamically controlling the performance of operations of a mobile device in accordance with legislative requirements of the particular location of the mobile device and in accordance with the requirements of application programs at either end of the communication link. The controlled operations are preferably communication-related operations such as encryption and decryption or applying of digital signatures.

In a first aspect, the invention provides a method and a mechanism that can be used to automatically switch cryptography strength and/or type when mobile computing devices cross country boundaries, or to break the mobile device's connection in a controlled way. This facilitates conformance of the mobile device's communications to different countries' cryptographic requirements.

The country of location of a mobile computing device is determined, and then information is obtained for identifying permitted cryptographic strengths or types for the identified location country. For example, the permitted cryptographic strengths or types may be identified in terms of specific permitted or prohibited algorithm names or key bit lengths. The provided information may also identify other country-specific communication prohibitions or restrictions.

A cryptographic component implementing a permitted algorithm is then selected for encrypting data in accordance with the requirements of the application programs at both ends of the communication and in accordance with the information on cryptographic restrictions, or the communication connection may be broken or the device or its encryption capabilities may be disabled.

In a first embodiment, the invention is implemented in an application service component for a first computing device.

The application service component is responsive to an identification of at least the country location of the first computing device to obtain information for identifying cryptographic components which can be used in the identified country without contravening legislative restrictions. The application service component either selects or validates selection of a cryptographic component in accordance with the obtained information and in accordance with communication requirements of a first application program located on the first computing device, for encrypting and decrypting data.

If the first computing device initiated the communication, it then preferably initiates validation of the selection in accordance with communication requirements of a second application program located on a second computing device with which data will be exchanged. The initiation of validation with reference to the second application's requirements may simply involve sending a request to a second computing device for creation of a communication channel, or may involve an explicit validation request.

Either the step of obtaining information to identify permitted cryptographic components, or the step of selecting or validating selection of a cryptographic component, or a subsequent validation step performed on either the first or second computing device prior to exchange of encrypted data, will also take account of the cryptographic requirements of the location country of the second device so as to ensure conformance with the requirements of the location countries of both the first and second devices.

The present invention's reference to application requirements in the dynamic selection of cryptographic functions and in the consideration of whether to break a connection has significant advantages over a mechanism which relies solely on facilities of the underlying communications stack to determine whether to enable or disable cryptographic algorithms. The invention according to the preferred embodiment implements a selection mechanism at the application layer of a layered model of communications system functions (e.g. the OSI model) and enables application programs to contribute to a negotiation of cryptographic functions by specifying their requirements, whereas a selection mechanism implemented at the communications layer would not.

Thus, taking account of application requirements and enabling application programs to contribute to the negotiations of which cryptographic algorithms to use or whether to break a connection achieves a negotiation result which is acceptable to the particular applications. When a communicating device crosses a country boundary, some applications may tolerate continued communication and application execution using a different encryption algorithm or using no encryption, whereas other application programs may require the connection to be broken if their specified criteria for the communication channel cannot be maintained. Other rules may require a device to be disabled. In all these cases, referring to the application requirements enables the appropriate action to be taken.

A mechanism implemented at the communications layer would also necessarily be specific to the particular communications support (for example, TCP or GSM specific) whereas the present invention provides a service which is more widely useable since it is not specific to a particular communication support layer.

An application service component according to the invention could be provided as a computer program product comprising computer readable program code recorded on a computer readable recording medium or as an integral component of a computing device.

In a second aspect of the invention, there is provided a method for controlling the operation of a first computing device including: in response to identification of the country location of at least the first computing device, obtaining information of legislative requirements relating to one or more communication operations of the first computing device for the identified country; and selecting or validating selection of an operation sequence in accordance with the obtained information and in accordance with communication requirements of at least a first application program located on the first computing device, for performing the one or more communication operations.

In a third aspect, the invention provides a mobile computing device including software for controlling the operation of the device to ensure conformance to legislative requirements of the current location of the device, the software controlling the device to execute processes to respond to identification of the country location of at least the mobile computing device by obtaining information of legislative requirements relating to one or more communication operations of the mobile computing device for the identified country, and to select or validate selection of an operation sequence in accordance with the obtained information and in accordance with communication requirements of at least a first application program located on the mobile computing device, for performing the one or more communication operations.

In a fourth aspect, the invention provides a computing apparatus for interoperating with a mobile computing device, the computing apparatus including software for controlling the operation of the computing apparatus to ensure conformance to legislative requirements of both the location of the computing apparatus and of the current location of the mobile computing device, the software controlling the apparatus to execute processes to respond to identification of the country location of the mobile computing device by obtaining information of legislative requirements relating to one or more communication operations for the identified country location of the mobile device and legislative requirements relating to the one or more communication operations for the country location of the computing apparatus, and to select or validate selection of an operation sequence in accordance with the obtained information and in accordance with communication requirements of at least a first application program located on the mobile computing device, for performing the one or more communication operations.

In a preferred embodiment of the invention, creation of a communications channel involves a first selection of a cryptographic component for encrypting and decrypting data sent across that channel. This is followed by subsequent checking of the validity of cryptographic functions, performed as a passive operation which is triggered by certain predefined events. Such an event may be a location determination identifying the crossing of a country boundary which then causes a mobile device to raise an interrupt prompting the application program to check the validity of cryptographic components for the new country combination.

In an alternative embodiment, an active process is used in which a country location determination is performed and then a list of permitted cryptographic functions (or a list of cryptographic restrictions for identifying permitted cryptographic components) is obtained and checked whenever data is to be encrypted for transmission.

There are many mechanisms which may be used for identifying a mobile device's location. In an embodiment of the invention for cellular telephones, the telephone passes a country query to the cellular network operating system either in response to receipt of a new broadcast cell identifier which is a notification that the telephone has moved, or periodically, or whenever data is to be exchanged. The cellular network operating system then manages a database retrieval operation to map the cell identifier to a specific country. In another embodiment, the Global Positioning System (GPS) is used to identify a device's location by polling satellites whenever encrypted data is to be exchanged.

BRIEF DESCRIPTION OF THE DRAWINGS

The preferred embodiments of the present invention will now be described in more detail, by way of examples, with reference to the accompanying drawings in which.

DESCRIPTION OF THE PREFERRED EMBODIMENTS

The present invention according to a preferred embodiment provides services for application programs running on mobile computing devices such as communications-enabled Personal Digital Assistants (PDAs), laptop and palmtop computers, computing devices embedded in vehicles, and the latest generation of application-enabled mobile telephones, as well as application programs running on computing devices which communicate with these mobile devices.

The invention enables conformance to the legislative requirements of different countries regarding the strength and type of cryptographic algorithm which can be used for encrypting/decrypting data, and enables maintaining conformance to local laws even when the mobile devices cross country boundaries. The invention provides a mechanism for dynamic switching of the strength and type of cryptography used, and enables breaking of connections in a controlled way. References to a country herein are intended to refer to any geographical or political area which may have specific cryptography requirements or other legislative requirements for communications.

Figure 1:
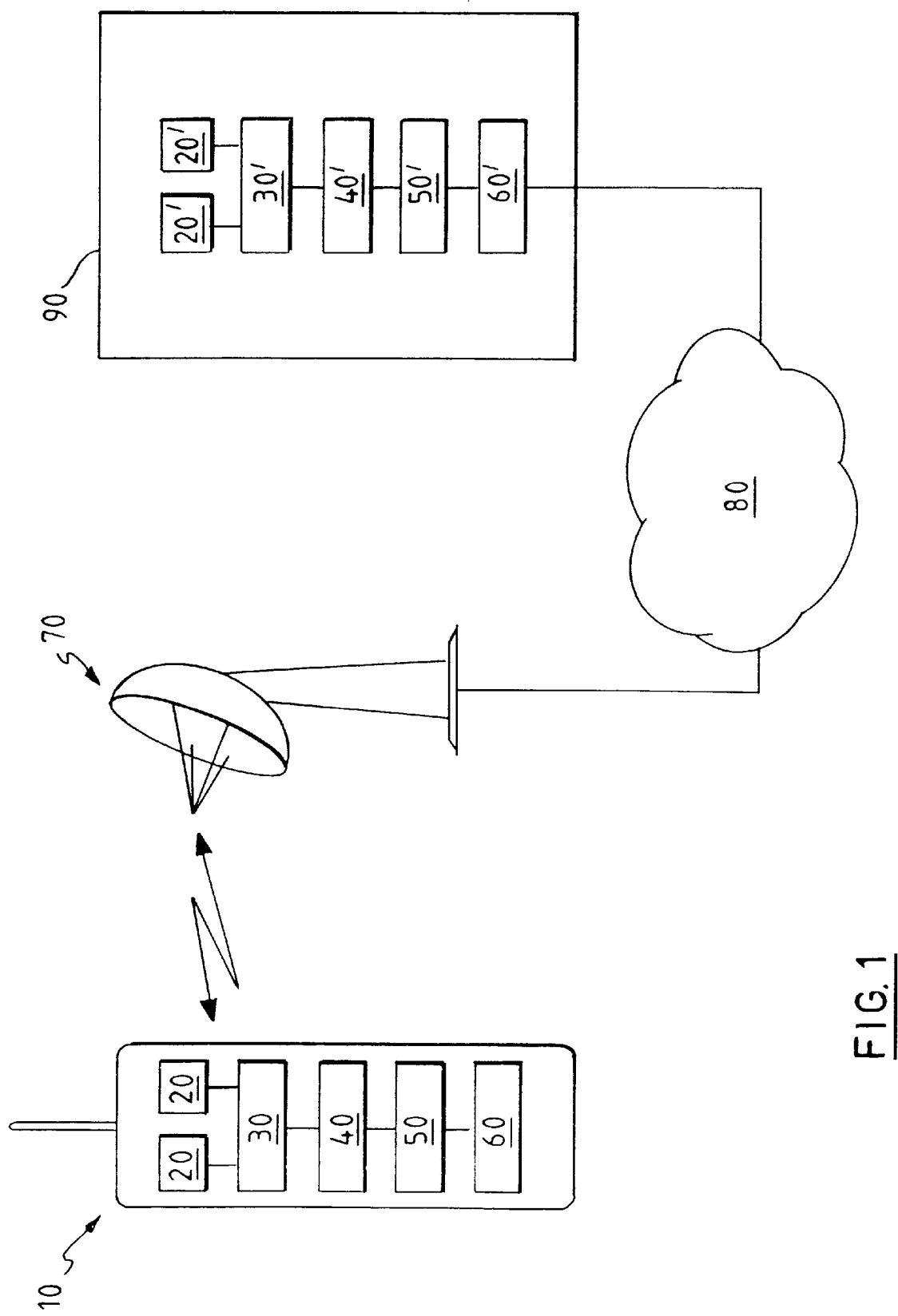
FIG. 1 is a schematic representation of a mobile computing device communicating with a second computing device across a communications network, each computing device including an application service component according to an embodiment of the invention.
Figure 2:
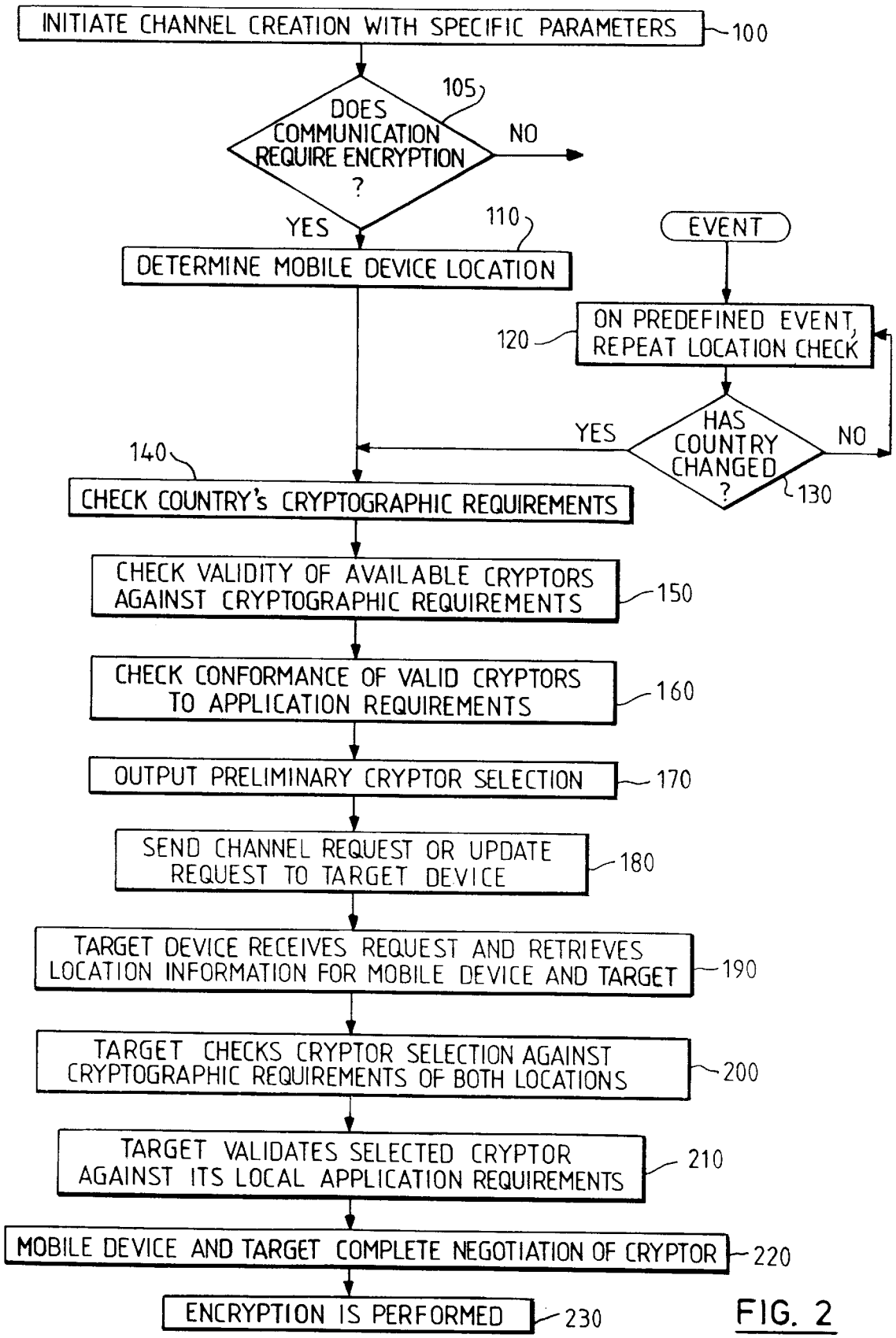
FIG. 2 shows the sequence of steps of a selection and validation of a cryptographic component according to an embodiment of the invention.

FIG. 1 shows a mobile computing device 10, for example a cellular telephone, which is capable of running a number of installed application programs 20. The software components installed on the mobile device include an application service component 30 positioned at the applications layer of a layered organisation of communications functions (such a layered organisation, with specific interfaces supporting the flow of data between layers, is standard for communications devices). The applications layer is the top layer of the seven layered standard Open systems Interconnection (OSI) model and of equivalent models of function layers, and so provides communications management services directly to application programs. The application layer is typically the layer at which communication partners are identified, application programs' transmission rate and error rate ("quality of service" parameter) requirements are identified, and any constraints on data syntax are identified.

The application service component 30 can be implemented as a Java(TM) software component which runs in the Java Virtual Machine (JVM) environment, to provide peer-to-peer services for application programs at run time. The application service component 30 may be one of a number of application service components provided at the application layer but discussion of such additional support services is beyond the scope of the present application. FIG. 1 represents schematically the layered organisation of functions including the JVM 40, the device's operating system 50, and underlying communications support layers 60.

The mobile computing device 10 communicates, for example via a cellular communications local network access node ("base station") 70 and network 80, with a remote computing device 90. The remote system may be any communication device, mobile or not, but for a first example let us assume that the remote system comprises a wired-connection computer system having a fixed position within a computer network. In particular, let us imagine that a program 20 running within the mobile telephone is communicating with a program 20' running on a bank's computer system 90. The holder of the mobile device is instructing a transfer of funds from one account to another. The bank and the mobile device would normally be encrypting the data flows to ensure that they are not tampered with.

When an application program 20 running on the mobile computing device 10 wishes to start exchanging data with an application program 20' on a remote system 90, a communications channel is created, instantiating an object class Channel. This channel creation includes the steps of specifying 100 a set of parameters for the channel including specifying the target address, assigning a channel identifier, timestamping, and identifying requirements for a cryptographic component, a compressor and an authenticator intended for use during the communication. The class Channel interfaces to classes Compressor, Authenticator and Cryptor. The application program typically specifies a set of quality of service requirements for the communications channel, and the channel will only be created if the application service component 30 determines that the application's requirements can be satisfied.

Selection of a cryptographic object, instantiating class Cryptor, under the control of the application service component and in accordance with the application program's requirements will now be described in detail.

Firstly, the mobile device determines 110 its current location. A number of mechanisms are available for location determination. For a cellular telephone, this is preferably done by the application service component on the mobile device initiating sending a query to a database which is accessible via the cellular network and which contains information mapping network cell identifiers (cell IDs) to country location information. The cell ID for the local network cell is included in the telephone's query, this cell ID having previously been broadcast by the local network access node or 'base station'. Such broadcasting of cell IDs by base stations is known in the art, but the information has not previously been made available for use by application service components on the mobile devices. The cellular network returns a country location identifier to the mobile device as the result of the database query.

Thereafter, the application service component 30 checks 120 the received cell ID broadcast by network access nodes to identify when the cell ID changes since this will indicate that the mobile device location has changed. These subsequent checks will be described later.

The application service component on the mobile device then checks 140 the cryptographic requirements of the identified country. A list of the cryptographic restrictions of different countries is preferably held in a table within non-volatile memory of the mobile device (for example in ROM of a cellular telephone), such that a table lookup operation can be performed locally using the country location identifier returned from the database query as a search key, without reliance on any third party to maintain the list of legislative requirements. In the particular embodiment of the invention implemented in Java, retrieved information on cryptographic restrictions for the identified country forms parameters of an object instance of Java class Locale.

The application service component then performs a check 150 of the validity of available cryptographic algorithms while taking account 160 of application-specified security requirements.

For example, an application program may have specified a minimum security level or desired security level, for example specifying a particular required cryptographic algorithm (such as 3DES) or a range of acceptable cryptographic key bit lengths (such as 128 bit or higher). The specified application requirements will be compared 160 by the application service component with the list of cryptographic restrictions for the particular device location and with the cryptographic strength and type of the available cryptographic components. The set of available cryptographic components which satisfy all of the application program's requirements and the legislative restrictions are identified as valid and a particular one is selected 170.

For certain mobile devices such as PDAs, memory resources may be so constrained that it is preferred not to store the list of cryptographic restrictions for various countries on the mobile device itself. For this reason, or to allow different users to use the same mobile device without compromising security, or to enable maintenance of current legislative requirements without having to update the mobile device itself, the list of restrictions and other communications rules can be provided within secure files on a Smart-Card which plugs into the mobile device. The SmartCard can also hold the mobile device user's public and private cryptographic keys and the public keys of previously designated communication partners.

A less preferred alternative to the SmartCard solution is for the mobile device to request from a remote database a list of the cryptographic restrictions for only the identified device location country and then to perform the check of the cryptographic components, validity using this list.

Having selected a first one of the available cryptographic components which satisfies local legislative requirements and local application requirements, the application service component sends 180 the channel request to the target application program on a remote computing device 70. This request includes the various specified parameters for the channel including an identifier of a selected one of the set of valid cryptographic components, a compressor and an authenticator, and the sender's public cryptographic key. The public keys will typically be digitally signed before being exchanged, to allow subsequent authentication.

In the present example, where the remote target device is a large network linked computer system, the target application program may be a banking application. In this particular example, the target system may be expected to implement greater checks than in the case of a peer to peer communication between application programs installed on mobile telephones, if only because of the regulations likely to be imposed upon financial institutions who support on-line transaction requests. That is, the bank's systems can be expected to enforce valid selection of cryptographic components with reference to the local restrictions applying to the mobile communication device as well as in relation to its own location country's cryptographic restrictions.

Thus, it is within the scope of the present invention to implement a policy of only checking local requirements which apply to the current device location and current application requirements, or to implement a policy of one or both communication devices checking legislative requirements which apply to both ends of the communication link.

An application service component on the bank's computer system responds to the request from the mobile device for establishment of a communication channel by determining 190 the location of the mobile communication device, for example retrieving an explicit country location identifier which was included in the request from a cellular telephone or using a cell ID included in that request to generate a database query. If no location information is included in the request, then the receiver application service component will not accept the call.

Having obtained location information for the mobile device, the application service component on the target computer system retrieves 190 its own country location information (stored locally) and inputs both of these location identifiers to a process which performs 200 a table lookup to identify legislative cryptographic restrictions for both locations. Following this, checks are performed 200, 210 to ensure consistency with the cryptographic restrictions the requirements of the application program on the target computer system, as was described previously for the mobile device.

Note that, as long as location information for the mobile device is provided to the target computer system, a possible alternative implementation of the present invention is for the mobile computing device to rely on the application service component on the target computer system with which it communicates to perform the check of cryptographic restrictions for both locations. If the channel criteria for the application program on the mobile device are sent to the target computer system, then the application service component on the target system could also perform the selection or validation of a cryptographic component. In that case, the selection and validation functions may not be replicated at the mobile device.

The application service components on the mobile device and target computer system then have available all the information required to enable negotiation of the parameters of the channel, including which compressor and authenticator are to be used and selecting a cryptographic component which satisfies both application requirements and both locations' legislative requirements, or to enable a decision to be made by the application service component that the connection should not be established if the applications, security level requirements cannot be met while also conforming to the relevant cryptography restrictions.

That is, the application service components at either end of the communication channel jointly decide whether to:
  Dynamically change the characteristics of the cryptography or key,
  Break the connection, or
  Disable the device If the cryptographic component initially selected as conforming to the requirements of the mobile device (location-specific legislation and application requirements) is not acceptable to the target system, then an attempt is made 220 to identify one of the available cryptographic components which meets the requirements of both ends of the channel. Typically the target system replies with an identification of an alternative cryptographic component which satisfies its requirements. If this alternative is not acceptable to the mobile device, the mobile device's application service component preferably sends to the target system an identification of the set of cryptographic components that satisfy the requirements of the mobile device so that the target system is then able to make a final selection or determination that the communication cannot proceed. Alternatively, the exchange of identifiers of proposed cryptographic components may continue until one of the device's list of valid cryptographic components is exhausted, or the negotiation of channel parameters may be abandoned if it does not produce a positive result within a predefined timeout period or within a predefined number of communication flows.

This negotiation process is performed simultaneously with the other aspects of "handshaking" negotiations which include selection of a compressor, selection of an authenticator, negotiating transmission speed and communication protocols, etc. Encryption, compression and authentication are then performed 230 on data in accordance with the negotiated functions prior to that data being transmitted.

In addition to performing the selection and validation process when a channel is created, additional validation is required to deal with the possibility of mobile devices crossing country boundaries during a communication. The possible approaches to performing validation subsequent to channel creation include:

1. a first 'active' approach in which the checking of location of the mobile device (and validation of cryptographic components when the country location has changed) which was described above in relation to channel creation is repeated 120 whenever encrypted data is to be sent or is received. Just before any data is encrypted or decrypted, a rules routing is invoked passing a type of cryptography, the data to be encrypted, and any relevant cryptographic keys. The rules routine queries the location, uses the location information to access a list of communication requirements for the location and updates the parameters of class Locale, and verifies that the specified type of cryptography and length of key are acceptable for this location.

This approach results in an increase in network communications since each location check and possibly also accessing the list of cryptographic restrictions require network communications. An active approach to location determination will be followed when GPS is used, since GPS requires active polling of satellites.

2. a second 'passive' approach in which location checking 120 and validation are only performed when triggered by a predefined event, such as one of the communicating devices crossing a country boundary. In the cellular telephone example described above, this can be implemented by controlling the application service component 30 to investigate the cell IDs received from base stations to identify a change of cell and only to initiate a location determination when such a change is recognised.

Generally, if the location identification operation 130 confirms that the mobile device has not crossed a country boundary then, for embodiments of the invention in which the mobile device checks only its own end of the communication, no further action is necessary for local validation and the communication with the remote computing device continues. Nevertheless, the mobile computing device sends its location information to the remote computing device each time this information is obtained, so as to enable the remote computing device to maintain updated information about device locations throughout a conversation which includes the remote computing device.

If the location identification operation confirms that a country boundary has been crossed, this causes the mobile device to raise an interrupt which then triggers retrieval 140 of the list of country-specific cryptographic restrictions and updates the country-specific parameters of class Locale. A comparison 150,160 of this list with application requirements is then performed to identify a set of possible cryptographic components or to verify the validity of a selected cryptographic component, as described previously.

The levels of cryptography and/or lengths of cipher key are then dynamically re-negotiated with the other end of the communications link. The connection could be broken or the application could be terminated or erased or the device locked depending on the application's requirements and the particular legislative requirements. If encrypting, the location information is appended to the outgoing data. If decrypting, the location of the decrypting device and the embedded location information in the incoming data can both be considered.

Then the actual encryption or decryption is performed. The rules process desirably takes account of both where the data originated and where it is received.

The above description states that the application service component on the mobile device can be expected to perform a check of at least its own device location and to select or validate selection of cryptographic components in accordance with the local legislative restrictions. While consideration of only its own location can be adequate when the mobile device is sending data to a remote target device if the target device could be relied on to perform its own assessment of the relevance of its local legislative restrictions, a more complete check of conformance to cryptographic and other communications restrictions involves the mobile device determining the location of the remote communicating device as well as its own location by sending a location query to the remote device. The results of this query can then be compared with the list of country-specific cryptographic restrictions, as with the device's own location information. This requires each communicating device to send its location information to the communication partner or requires each device to be able to identify the location of both devices in some other way.

Similarly, when the mobile device is a receiver of encrypted data the application service component on the mobile device preferably checks the validity of cryptographic components in relation to both its own location and the location of the device from where the data originates.

A number of alternatives are available to the above described determination of the location of a cellular telephone. For example the Global Positioning System (GPS) may be used if the costs of satellite communications are not considered prohibitive. Satellites are polled whenever data is to be sent and the position coordinates provided by GPS are mapped to a particular country using a database of country boundaries. Country boundaries can be described with sufficient accuracy as polygons, and then the mapping of coordinates to countries is relatively simple. This is described, for example, in U.S. Pat. No. 5,781,628 which is incorporated herein by reference.

Other mechanisms for location determination may also be used without departing from the scope of the present invention. In the cellular telephone network example, the country location information could be periodically signalled to the mobile device such that the device does not have to initiate a query before it sends or receives data. The network access stations could include the country location information with the broadcast cell ID.

As is clear from the above example implementation, the location determination operation may be performed either by only one of the communicating devices using location information for both devices or may involve a determination for selection or selection-validation at both ends of the communication.

An embodiment of the invention has been described above in relation to an application service component for achieving conformance of mobile device communications to different cryptographic laws. The invention also enables dynamic control of the performance of operations other than encryption and decryption for a mobile device in accordance with legislative requirements which are relevant to the current location of the mobile device and in accordance with the requirements of application programs at either end of the communication link.

Examples of other applications of the invention are for ensuring conformance to laws prohibiting use of certain technologies within specific countries (for example, if that technology is relevant to defence), and laws which dictate the language which must be used or technical criteria to be met by digital signatures used for financial institutions' electronic transactions. In the former example, a location determination is followed by a check of whether the current location of a mobile device is a prohibited location for use of the device, in which case the device is disabled. In the language requirement example, translation software components may be selected to ensure conformance of transmitted data to the language requirements.

In the digital signature example, information regarding the required technical criteria may be obtained and then used in the selection of a specific digital signature algorithm. As well as performing a country location determination for a mobile device, it may also be required that financial transaction instructions are self identifying such that the process of checking country legislative requirements can be triggered when an instruction identifies itself as being part of a financial transaction. The application service component could implement the logic for responding to such subject identifiers or other triggers.

What is claimed is:

1. A computer program product comprising computer readable program code stored on a computer readable storage medium, for providing communication services to application programs on a first computing device, the program code including means for dynamically controlling the operation of the first computing device to execute processes
  to respond to automatic identification of the country location of at least the first computing device by obtaining information for identifying permitted cryptographic components for the identified country or countries, and
  to dynamically select or validate selection of a cryptographic component in accordance with the obtained information and in accordance with communication requirements of at least a first application program on the first computing device, for encrypting and decrypting data.

2. A computer program product according to claim 1, wherein validation of the selection is performed on the first computing device, or on a second computing device with which the first computing device communicates, in accordance with communication requirements of a second application program on the second computing device.

3. A computer program product according to claim 2 wherein, in response to a failure to dynamically select or validate selection of a cryptographic component which satisfies the requirements of both the first and second application programs, the communication connection is broken.

4. A computer program product according to claim 1, wherein validation of the selection is performed on the first computing device, or on a second computing device with which the first computing device communicates, in accordance with an identification of permitted cryptographic components for the country location of the second computing device.

5. A computer program product according to claim 1, for initiating automatic identification of the country location of the first computing device when establishing a communication connection between an application program on the first computing device and a remote application program.

6. A computer program product according to claim 5, for repeating initiation of the automatic country location identification in response to predefined events during the communication.

7. A computer program product according to claim 6, wherein said predefined events include the processing of an instruction to encrypt or decrypt data.

8. A computer program product according to claim 6, for controlling the operation of a cellular telephone, wherein said predefined events include receipt of a new cell identifier from a cellular network access node.

9. A computer program product according to claim 6, wherein said steps of obtaining information for identifying permitted cryptographic components and dynamically selecting or validating selection of a cryptographic component are only repeated when the country location has changed.

10. A computer program product according to claim 1, wherein the dynamically selected cryptographic component is a digital signature component.

11. A computer program product according to claim 10, wherein the identification of permitted components and dynamic selection or validation of selection are performed in response to a financial transaction instruction identifier.

12. A computer program product according to claim 1, including means for dynamically selecting or validating selection of an authenticator component in accordance with the communication requirements of at least a first application program on the first computing device.

13. A computer program product according to claim 1, including means for dynamically selecting or validating selection of a compressor component in accordance with the communication requirements of at least a first application program on the first computing device.

14. A method for dynamically controlling the operation of a first computing device including:
  in response to automatic identification of the country location of at least the first computing device, obtaining information for identifying permitted cryptographic components for the identified country or countries; and
  dynamically selecting or validating selection of a cryptographic component in accordance with the obtained information and in accordance with communication requirements of at least a first application program on the first computing device, for encrypting and decrypting data.

15. A method according to claim 14, including dynamically selecting or validating selection of an authenticator component in accordance with the communication requirements of at least a first application program on the first computing device.

16. A method according to claim 14, including dynamically selecting or validating selection of a compressor component in accordance with the communication requirements of at least a first application program on the first computing device.

17. A mobile computing device including software for dynamically controlling the operation of the device to ensure conformance to legislative requirements of the current location of the device, the software controlling the device to execute processes

- to respond to automatic identification of the country location of at least the mobile computing device by obtaining information for identifying permitted cryptographic components for the identified country or countries, and
- to dynamically select or validate selection of an operation sequence in accordance with the obtained information and in accordance with communication requirements of at least a first application program on the mobile computing device, for encrypting and decrypting data.

18. A computing apparatus for interoperating with a mobile computing device, the computing apparatus including software for dynamically controlling the operation of the computing apparatus to ensure conformance to legislative requirements of both the location of the computing apparatus and of the current location of the mobile computing device, the software controlling the apparatus to execute processes

- to respond to automatic identification of the country location of the mobile computing device by obtaining information for identifying permitted cryptographic components for the identified country location of the mobile device and for identifying permitted cryptographic components for the country location of the computing apparatus, and
- to dynamically select or validate selection of a cryptographic component in accordance with the obtained information and in accordance with communication requirements of at least a first application program on the mobile computing device, for encrypting and decrypting data.

* * * * *